United States Patent Office 3,813,400
Patented May 28, 1974

3,813,400
DERIVATIVES OF 3-AMINO-1,2,4-TRIAZOLES
John Terence Arnott Boyle, Maidenhead, and John Christopher Saunders, Taplow, Maidenhead, England, assignors to John Wyeth & Brother Limited, Taplow, Maidenhead, England
No Drawing. Filed Nov. 29, 1972, Ser. No. 310,289
Claims priority, application Great Britain, Dec. 6, 1971, 56,466/71
Int. Cl. C07d 31/44
U.S. Cl. 260—295 AM          8 Claims

ABSTRACT OF THE DISCLOSURE

The invention relates to triazole derivatives of formula

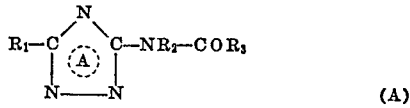
(A)

where A designates a 1,2,4-triazole ring carrying a hydrogen atom or lower alkyl group $R_2$ is hydrogen or lower alkyl, one of $R_1$ and $R_3$ is a substituted or unsubstituted pyridyl group the other of $R_1$ and $R_3$ is a aryl, heteroaryl or phen(lower)alkyl group which can be substituted. The compounds are useful pharmacologically and possess one or more of the following activities: anti-depressant activity, anti-tubercular activity, anti-inflammatory and inhibition of blood platelet aggregation. New triazole derivatives of formula

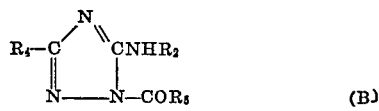
(B)

where $R_2$ is hydrogen or lower alkyl, $R_4$ is optionally substituted pyridyl and $R_5$ is optionally substituted phenyl, are intermediates for the preparation of compounds of formula A by thermal isomerization.

---

The present invention relates to new derivatives of 3-amino-1,2,4-triazoles, a process for their manufacture and pharmaceutical compositions containing them.

The compound, 1-benzoyl-3-phenyl-5-amino-1,2,4-triazole of structure

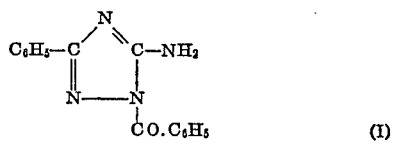
(I)

is disclosed in the literature. Upon thermal isomerization the compound is converted to 3-phenyl-5-benzamido-1,2,4-triazole of structure

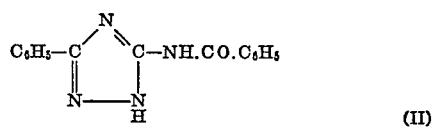
(II)

The compound of formula II may also be designated 3-benzamido-5-phenyl-1,2,4-triazole.

The present invention presents new derivatives of 3-amino-1,2,4-triazoles that contain a pyridyl group, preferably a 4-pyridyl group. The new compounds of the invention are monoacyl substitution products of compounds of the formula

(III)

and their acid addition salts where the acyl group is $COR_3$, A designates a 1,2,4-triazole ring carrying a hydrogen atom or lower alkyl group on one of the three ring nitrogen atoms of the said 1,2,4-triazole ring, $R_2$ represents a hydrogen atom or a lower alkyl group; one of $R_1$ and $R_3$ represents an optionally substituted pyridyl group and the other of $R_1$ and $R_3$ represents an aryl or heteroaryl or phen(lower)alkyl group which may be substituted. The invention primarily concerns compounds in which the amino group —$NHR_2$ is substituted by the acyl substituent $R_3CO$—, but also includes compounds which may have acyl substituent $R_3CO$— on the triazole ring.

Thus the present invention primarily provides new 3-acylamino-1,2,4-triazoles of the formula

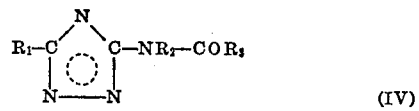
(IV)

and their acid addition salts where A designates a 1,2,4-triazole ring carrying a hydrogen atom or a lower alkyl group on one of the three ring nitrogen atoms; $R_2$ designates a hydrogen atom or lower alkyl group; one of $R_1$ and $R_3$ designates a pyridyl group, optionally substituted aryl or heteroaryl group preferably with up to 10 ring carbon atoms such as phenyl, naphthyl, thienyl or pyridyl or optionally substituted phen(lower)alkyl group and their acid addition salts. The said aryl or heteroaryl group or phen(lower)alkyl group may be substituted by a substituent for example a polymethylene chain, for instance as in the case of a tetrahydronaphthyl, a halogen atom, for instance, chlorine or bromine or a trifluoromethyl group, an amino group, a lower alkyl substituted amino group (for example a mono(lower)alkyl substituted amino group such as methylamino or ethylamino or a di(lower)alkyl substituted amino group such as dimethylamino or diethylamino), a hydroxyl group, a lower alkyl group, for instance, methyl, ethyl, propyl or butyl, or a lower alkoxy group, for instance, methoxy, ethoxy or propoxy. The term "aryl or heteroaryl" contemplates groups of aromatic character. The group can be heterocyclic, for example, a monocyclic heteroaryl containing a sulphur, nitrogen or oxygen atom. Illustrative examples include furyl, thienyl and pyridyl. Alternatively the group may be carbocyclic, for example, phenyl or naphthyl. The term "lower" in connexion with "lower" alkyl or 'lower" alkoxy denotes that the alkyl or alkoxy group contains 1 to 6, preferably 1 to 4 carbon atoms. As illustrative members of lower alkyl there may be mentioned methyl, ethyl, n-propyl and n-butyl. As illustrative members of lower alkoxy groups there may be mentioned methoxy, ethoxy, propoxy and butoxy. The pyridyl group is preferably a 4-pyridyl group, but may be a 2- or 3-pyridyl group.

When the compounds of formula III are acylated the location of the acyl group in the acylation product can vary. However, in many cases acylation of a compound of formula III leads directly to compounds of the formula

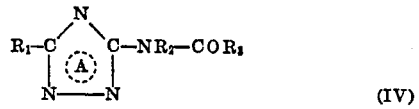
(IV)

In the other cases there is formed an intermediate which can isomerize to a compound of formula IV. In these cases acylation of compounds of formula III where the 1,2,4-triazole ring carries a hydrogen atom on one nitrogen atom leads to new compounds in which a ring nitrogen atom is substituted by the acyl group. This reaction particularly occurs when $R_1$ represents an optionally substituted pyridyl group with the formation of compounds having the formula

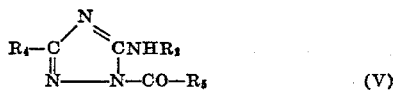
(V)

where $R_4$ is an optionally substituted pyridyl group and $R_5$ is an optionally substituted aryl group. Compounds of formula V can be converted into compounds of formula IV by a thermal isomerization. In formula V $R_4$ is preferably a 4-pyridyl group and $R_5$ is preferably phenyl, halophenyl or lower alkyl phenyl group.

It will be apparent to those skilled in the art that compounds of formula II and their acylation products where the 1,2,4-triazole ring carries a hydrogen atom may exist in different tautomeric structures. Thus the 1,2,4-triazole ring in these cases may have the formulae

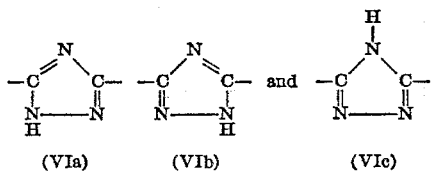

(VIa)  (VIb)  (VIc)

Where compounds of the invention may exist in more than one tautomeric structure it is to be understood that all tautomeric forms are intended to be comprehended by the invention.

The aforesaid compounds of the invention may be prepared by a process, in which a compound of formula III as illustrated and defined above or an acid addition salt thereof is monoacylated to introduce the acyl radical $R_3CO-$ where $R_3$ is as defined above, and if necessary or desired the monoacylation product is subjected to a thermal isomerisation, and if desired a free base is converted into an acid addition salt or an acid addition salt into a free base and if desired a functional substituent protected by a blocking group is converted into the free functional substituent by removal of the blocking group.

The starting products of formula II are known products or, where new, may be prepared in a manner known *per se*.

The acylation may be carried out with any acylating derivative of the acid $R_3COOH$. In particular acyl halides, preferably the acyl chloride of the formula $R_3COCl$ may be used as acylating agent. The acylation is preferably carried out in solvent substantially inert under the reaction conditions such as dimethylformamide or hexamethylphosphoric triamide. The acylation derivatives can be prepared from the acid $R_3COOH$ by known reactions, for example, acyl chloride may be prepared from thionyl chloride and the acid $R_3COOH$ in known manner. The use of hexamethylphosphoric triamide as inert solvent for the acylation reaction is particularly advantageous since the acyl chloride can readily be prepared at a low temperature from thionyl chloride and the acid in the solvent and the resulting solution employed directly in the acylation without any work-up or transfer to another reaction vessel. The acylated product can be recovered from the reaction mixture in accordance with known isolation methods.

Where necessary or desired the acylation product can be subjected to a thermal isomirezation to obtain the compound of formula IV. This step can be carried out by heating the acylation product at a temperature above its melting point (and below its decomposition temperature) for a short period under an inert atmosphere such as nitrogen. In this manner compounds of formula V are converted to those of formula IV.

Where the desired product contains a substituent group sensitive to acylation, such as a free hydroxy group or an amino group, it is expedient to employ a corresponding starting compound in which the substituent is functionally protected by a removable blocking group and remove the blocking group in known manner. The removal of the blocking group may be before or after the thermal isomerization step, if employed. As an example of a blocking group there may be particularly mentioned benzyl, which can be removed by hydrogenolysis. The new compounds of the invention are generally quite stable to acid conditions. Thus blocking groups which readily hydrolyze off under acid conditions may be employed.

The new compounds of the invention may be in the form of a free base or an acid addition salt. Acid addition salts may be made by adding the acid to the free base in known manner. As acids that may be employed there may be mentioned such organic acids as maleic, fumaric, and tartaric acid and such inorganic acids as hydrochloric acid and sulphuric acid.

The new compounds of formulae IV and V are useful pharmacologically or as chemical intermediates. In particular compounds of formula IV demonstrate one or more of the following activities: anti-depressant activity, anti-tubercular activity, anti-inflammatory activity and inhibition of blood platelet aggregation. The anti-inflammatory activity of 3-isonicotinamido-5-phenyl-1(H)-1,2,4-triazole and its pharmaceutically suitable salts is particularly interesting. The compounds of formula V are useful as intermediates for the preparation of compounds of formula IV and, in certain cases show pharmacological utility. For instance 5-amino-1-(p-chlorobenzoyl)-3-(4-pyridyl)-1,2,4-triazole shows anti-inflammatory activity and anti-tubercular activity.

The anti-inflammatory agents of the invention show the advantage of a reduced acidity compared with prior art anti-inflammatory agents. Acid anti-inflammatory agents tend to have the disadvantage that they result in ulceration or gastric irritation.

The pharmacological evaluation of compounds of the invention is carried out using known methods on laboratory animals. Examples of tests which can indicate that a compound has anti-inflammatory activity are those described by Winter et al. in Proc. Soc. Exp. Biol. Med., *111*, 544 (1962); Buttle et al. in Nature, *179*, 629 (1957); Konzett and Rossler in Arch. Path. Pharmac., *195*, 71 (1940); and Newbould in Brit. Jour. Pharm. Chemoth., *21*, 127–137 (1963).

The invention also includes pharmaceutical compositions containing as active ingredients a compound of formula IV or a pharmaceutically acceptable acid addition salt thereof which may be micronized if desired. In addition to the active ingredient, said compositions also contain a non-toxic carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavoring agents, lubricants, solubilizers, suspending agents, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilized by intramuscular, intraperitoneal or subcutaneous injection. In many instances a compound is orally active and can be administered orally either in liquid or solid composition form.

Preferably the pharmaceutical composition is in unit dosage form. In such form, the composition is sub-divided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in package form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

The following non-limiting examples illustrate the invention:

EXAMPLE 1

3-isonicotinamido-5-phenyl-1(H)-1,2,4-triazole

Isonicotinoyl chloride hydrochloride, prepared from 24.6 g. of isonicotinic acid and thionyl chloride, was added in portions to a stirred solution of 3-amino - 5 - phenyl-1(H)-1,2,4-triazole (14.4 g.) in dimethylformamide-(225 ml.) and triethylamine (70 ml.). A vigorous reaction ensued and the reaction mixture was stirred for two days at room temperature, filtered and poured into water. The title compound (10.5 g.) separated, and, after standard for four hours, was filtered, washed and dried. On standing three days a further quantity of the product (3.5 g.) was obtained from the filtrate.

A sample of this base (5.0 g.) was dissolved in hot 2 N hydrochloric acid and 3.5 g. of the hydrochloride, M.P. 275–9° C., crystallized on cooling.

*Analysis.*—Found: 54.8% C; 4.1% H; 22.9% N. $C_{14}H_{11}N_5O \cdot HCl \cdot \frac{1}{4}H_2O$ requires: 54.9% C; 4.1% H; 22.9% N.

EXAMPLE 2

3-nicotinamido-5-phenyl-1(H)-1,2,4-triazole

The title compound was prepared as Example 1, using nicotinic acid (30.8 g.) and 3-amino-5-phenyl-1(H)-1,2,4-triazole (16.0 g.). The yield of the title compound was 13.9 g. A portion of this base (5.0 g.) was converted to the hydrochloride (1.4 g., M.P. 204–14° C.) in isopropanol/diethyl ether.

*Analysis.*—Found: 49.6% C; 4.1% H; 20.6% N. $C_{14}H_{11}N_5O \cdot 2HCl$ requires: 49.7% C; 3.9% H; 20.7% N.

EXAMPLE 3

3-picolinamido-5-phenyl-1(H)-1,2,4-triazole

This was prepared as Example 1, using picolinic acid (30.8 g.) and 3-amino-5-phenyl-1(H)-1,2,4-triazole-(16.0 g.). The workup was modified as follows. After pouring into water the solution was left to stand for a few days and then filtered. The insoluble material was extracted with ethyl acetate in a Soxhlet apparatus and the resulting solution was treated with charcoal, filtered and evaporated. The residue was crystallized from ethanol to give 0.54 g. of the product (M.P. 227° C.), as the second crop.

*Analysis.*—Found: 63.3%; 4.3% H; 26.2% N. $C_{14}H_{11}N_5O$ requires: 63.4% C; 4.2% H; 26.4% N.

EXAMPLE 4

3-(N-methyl-isonicotinamido)-5-phenyl-1(H)-1,2,4-triazole (a) Benzoyl chloride (24.0 g.) was added dropwise to a stirred solution of 1-amino-3-methyl-guanidinium iodide (32.3 g.) in 2 N NaOH (250 ml.), cooled in an ice/salt bath. The solution was stirred for three hours, refluxed for two hours, then cooled, acidified, filtered and neutralized to give 3-methylamino-5-phenyl-1(H)-1,2,4-triazole (9.4 g.).

A sample of this amine was converted to the hydrochloride (M.P. 251–4° C.) and recrystallized from ethanol/diethyl ether.

*Analysis.*—Found: 51.3% C; 5.3% H; 26.5% N. $C_9H_{10}N_4HCl$ requires: 51.3% C; 5.3% H; 26.6% N.

(b) A solution of 3-methylamino-5-phenyl-1(H)-1,2,4-triazole (3.5 g.) in dimethylformamide (100 ml.) and triethylamine (15.3 ml.) was added to isonicotinoyl chloride hydrochloride prepared from 6.2 g. of the acid with thionyl chloride and the mixture was stirred for twenty hours at room temperature. The reaction mixture was filtered and the filtrate poured into water. As only a little solid separated, the aqueous solution was extracted with chloroform, which was then washed with water, dried over magnesium sulphate and evaporated under vacuum to remove the chloroform and also dimethylformamide. The residue was recrystallized from ethyl acetate to give the title compound (1.2 g., M.P. 180.5–181.5° C.).

*Analysis.*—Found: 64.3% C; 4.6% H; 25.1% N. $C_{15}H_{13}N_5O$ requires: 64.5% C; 4.7% H; 25.1% N.

EXAMPLE 5

3-isonicotinamido-5-p-chlorophenyl-1(H)-1,2,4-triazole

Isonicotinic acid (12.3 g.) was dissolved in hexamethylphosphorictriamide (45 ml.) at 0° C., thionyl chloride (13.0 g.) was added, and the solution was kept below 5° C. for one hour. A solution of 3-amino-5-p-chlorophenyl-1,2,4-triazole (9.73 g.) and triethylamine (2.5 g.) in hexamethylphosphoric triamide (45 ml.) was then added gradually over one hour. The mixture was stirred overnight at room temperature, poured into 1.5 l. of water, and adjusted to pH 5. The precipitated solid was filtered off and washed with hot ethanol to give the title compound (9.6 g.), M.P. 288–290° C.

*Analysis.*—Found: C, 54.3%; H, 3.5%; N, 23.0%. $C_{14}H_{10}ClN_5O \cdot \frac{1}{2}H_2O$ requires: C, 54.5%; H, 3.59%; N, 22.7%.

EXAMPLE 6

3-isonicotinamido-5-p-bromophenyl-1(H)-1,2,4-Triazole

This was prepared in the manner given in Example 5, using 3-amino-5-p-bromophenyl-1,2,4-triazole (11.96 g.). The title compound, M.P. 283–286° C. was obtained in a yield of 14.4 g.

*Analysis.*—Found: C, 48%; H, 3.10%; N, 19.6%. $C_{14}H_{10}BrN_5O \cdot \frac{1}{2}H_2O$ requires: C, 47.6%; H, 3.14%; N, 19.8%.

EXAMPLE 7

3-isonicotinamido-5-p-methoxyphenyl-1(H)-1,2,4-triazole

Prepared as Example 5, using 3-amino-5-p-methoxyphenyl-1,2,4-triazole (9.5 g.), to give the title compound (12.9 g.), M.P. 266–267° C.

*Analysis.*—Found: C, 60.0%; H, 4.54%; N, 23.0%. $C_{15}H_{13}N_5O_2 \cdot \frac{1}{4}H_2O$ requires: C, 60.1%; H, 4.54%; N, 23.4%.

EXAMPLE 8

3-isonicotinamido-5-o-chlorophenyl-1(H)-1,2,4-triazole (a) A methylisothiouronium sulphate (27.8 g.) was added with stirring to N/1 sodium hydroxide solution (200 ml.) and ethanol (200 ml.) cooled in an ice-bath. o-Chlorobenzhydrazide (34.1 g.) was added, and after storage for four days at room temperature, the mixture was heated to 50° C. and kept at this temperature for three hours. After cooling the precipitated solid was collected and recrystallized from 91% ethanol to give o-chlorobenzamido guanidine (26.1 g.), M.P. 160–161° C.

*Analysis.*—Found: C, 44.9%; H, 4.25%; N, 26.2%. $C_8H_9ClN_4O$ requires: C, 45.2%; H, 4.27%; N, 26.4%.

(b) The benzamidoguanidine (8.0 g.) of part (a) was heated at 185° under nitrogen for fifteen minutes. Frothing occurred and the materal resolidified. Recrystallization of this solid from ethanol gave 3-amino-5-o-chlorophenyl-1(H)-1,2,4-triazole (5.6 g.). A sample of this base was converted in ethanol to the hydrochloride, M.P. 198–199° C.

*Analysis.*—Found: C, 42.0%; H, 3.60%; N, 24.3%. $C_8H_2ClN_4 \cdot HCl$ requires C, 14.8%; H, 3.51%; N, 24.4%.

(c) The procedure described in Example 5 was carried out but the aminotriazole (9.73 g.) of part (b) was used. There was obtained 3-isonicotinamido-5-o-chlorophenyl-1(H)-1,2,4-triazole (9.5 g.), M.P. 262–263° C.

*Analysis.*—Found: C, 55.8%; H, 3.39%; N, 23.4%. $C_{14}H_{10}ClN_5O$ requires: C, 56.1%; H, 3.36%; N, 23.4%.

EXAMPLE 9

3-isonicotinamido-5-p-tolyl-1(H)-1,2,4-triazole (a) The procedure described in Example 8(a) was carried out, except that p-methylbenzhydrazide (30.0 g.) was used. There was obtained p-methylbenzamidoguanidine (40.0 g.), M.P. 191° C.

*Analysis.*—Found: C, 56.6%; H, 6.42%; N, 29.2%. $C_9H_{12}N_4O$ requires: C, 56.3%; H, 6.30%; N, 29.2%.

(b) The procedure described in Example 8(b) was carried out but with heating the benzamidoguanidine of part (a) of this Example at 200° C. There was obtained 3-amino-5-p-tolyl-1(H)-1,2,4-triazole (3.5 g.). A sample of this base was converted in ethanol to the hydrochloride, M.P. 275–280° C.

*Analysis.*—Found: C, 51.6%; H, 5.22%; N, 26.6%. $C_9H_{10}O_4 \cdot HCl$ requires: C, 51.3%; H, 5.26%; N, 26.6%.

(c) The procedure described in Example 5 was carried out using the aminotriazole (8.71 g.) of part (b) of this example. There was obtained 3-isonicotinamido-5-p-tolyl-1(H)-1,2,4-triazole (9.1 g.). A portion of this compound was converted in ethanol to the hydrochloride, M.P. 250–252° C.

*Analysis.*—Found: C, 56.9%; H, 4.5%; N, 21.8%. $C_{15}H_{13}N_5O \cdot HCl$ requires: C, 57.1%; H, 4.47%; N, 22.2%.

EXAMPLE 10

3-nicotinamido-5-p-tolyl-1(H)-1,2,4-triazole

The procedure of Example 5 was carried out using nicotinic acid (12.3 g.) and the aminotriazole (8.71 g.) of Example 9(b). There was obtained the title compound (7.9 g.), M.P. 260° C.

*Analysis.*—Found: C, 64.5%; H, 4.74%; N, 24.8%. $C_{15}H_{13}N_5O$ requires: C, 64.5%; H, 4.70%; N, 25.1%.

EXAMPLE 11

3-isonicotinamido-5-(4-pyridyl)-1(H)-1,2,4-triazole

The procedure of Example 5 using 3-amino-5-(4-pyridyl-1(H)-1,2,4-triazole (8.1 g.) gave the crude product. This was washed with hot ethanol followed by hot ethyl acetate and then dissolved in hot 6 N hydrochloric acid and crystallized on adding acetone as the di-hydrochloride (4.8 g., decomposition at 340° C.).

*Analysis.*—Found: 44.8% C; 3.6% H; 24.4% N. $C_{13}H_{10}N_6O \cdot 2HCl \cdot \frac{1}{2}H_2O$ requires: 44.8% C; 3.8% H, 24.1% N.

EXAMPLE 12

3-nicotinamido-5-(4-pyridyl)-1(H)-1,2,4-triazole

The procedure of Example 5, using nicotinic acid (12.3 g.) and 3 - amino-5-(4-pyridyl)-1(H)-1,2,4-triazole (8.1 g.) was carried out. The crude product was washed with hot ethyl acetate and dissolved in hot 6 N hydrochloric acid from which the title compound crystallized on addition of acetone as the dihydrochloride (7.0 g., d. 290° C.).

*Analysis.*—Found: 44.7 C; 3.8% H; 24.3% N. $C_{13}H_{10}N_6O \cdot 2HCl$ requires: 44.8% C; 3.8 H; 24.1% N.

EXAMPLE 13

3-nicotinamido-5-(3-pyridyl)-1(H)-1,2,4-triazole

The procedure of Example 5 using nicotinic acid (24.6 g.) and 3-amino-5-(3-pyridyl)-1(H)-1,2,4-triazole (16.1 g.) was carried out. The crude product (11.9 g.) was crystallized from hot 6 N hydrochloric acid and acetone as the di-hydrochloride (9.1 g.). A portion (5.0 g.) of this was recrystallized from water/acetone to give the pure di-hydrochloride hydrate (1.5 g., M.P. 264–90° C.) as the second fraction.

*Analysis.*—Found: 43.5% C; 4.0% H; 23.2% N. $C_{13}H_{10}N_6O_2HCl \cdot H_2O$ requires: 43.7% C; 4.0% H; 23.5% N.

EXAMPLE 14

3-benzyl-5-isonicotinamido-1(H)-1,2,4-triazole

The procedure of Example 5 was carried out using 3-amino-5-benzyl-1,2,4-triazole (8.71 g.), to give the title compound (7.3 g.), M.P. 206–208° C.

*Analysis.*—Found: C, 62.6%; H, 4.81%; N, 24.2%. $C_{15}H_{13}N_5O \cdot \frac{1}{2}H_2O$ requires: C, 62.5%; H, 4.90%, N, 24.3%.

EXAMPLE 15

3-isonicotinamido-4-methyl-5-phenyl-1,2,4-triazole (a) 1-benzoyl-4-methyl-aminoguanidine (from 54.0 g. 4-methyl-aminoguanidinium iodide and 42.0 g. benzoyl chloride in pyridine), was refluxed for twenty hours in 50% ethanol/water (100 mls.). The solvent was removed by evaporation and the residue was washed with hot ethyl acetate. The insoluble material was dissolved in water and basified with potassium carbonate to give an oil which crystallized (3-methyl-amino-5-phenyl-1(H)-1,2,4-triazole). Evaporation of this basic solution and fractional crystallizations of the residue twice from water and from ethanol/di-isopropyl ether, gave 3 - amino-4-methyl-5-phenyl-1,2,4-triazole (9.1 g.). The monohydrochloride (M.P. 230–3° C.) was prepared.

*Analysis.*—Found: 61.8% C; 5.8% H; 32.1% N. $C_9H_{10}N_4$ requires: 62.1% C; 5.8% H; 32.2% N.

(b) The title compound was prepared as in Example 5, using isonicotinic acid (6.2 g.) and 3-amino-4-methyl-5-phenyl-1,2,4-triazole (8.7 g.) to give the crude product (6.2 g.). A sample portion (5.0 g.) was converted to the hydrochloride in ethanol/diethylether and recrystallized to give the pure product (2.6 g., M.P. 249° C.).

*Analysis.*—Found: 56.9% C; 4.5% H; 22.0% N. $C_{15}H_{13}N_5O \cdot HCl$ requires: 57.1% C; 4.5% H; 22.2% N.

EXAMPLE 16

5-amino-1-(p-chlorobenzoyl)-3-(4-pyridyl)-1,2,4-triazole p-Chlorobenzoyl chloride (19.3 g.) was added dropwise to a solution of 3-amino-5-(4-pyridyl)-1(H)-1,2,4-triazole (8.1 g.) in dry pyridine (50 ml.) cooled by an ice bath. The reaction mixture was stirred for three hours at room temperature and then poured into water to give a precipitate, which was filtered, dried and washed with hot ethyl acetate to give the title compound (8.3 g.).

This compound was dissolved in chloroform/methanol and, on addition of ethereal hydrogen chloride, the hydrochloride (3.1 g., M.P. 343–5° C.) crystallized.

*Analysis.*—Found: 50.0% C; 3.3% H; 20.9% N. $C_{14}H_{10}ClN_5O \cdot HCl$ requires: 50.0% C; 3.3% H; 20.8% N.

EXAMPLE 17

5-amino-1-(p-chlorobenzoyl)-3-(3-pyridyl)-1,2,4-triazole

This was prepared as in Example 16 using 3-amino-5-(3-pyridyl)-1(H)-1,2,4-triazole (8.1 g.). The crude product was washed with 1 N NaOH solution and hot methanol to give the title compound (6.0 g., M.P. 354–6°).

*Analysis.*—Found: 56.4% C; 3.4% H; 23.1% N. $C_{14}H_{10}ClN_5O$ requires: 56.1% C; 3.4% H; 23.4% N.

EXAMPLE 18

5-amino-3-(4-pyridyl)-1-(o-toluoyl)-1,2,4-triazole

This was prepared as in Example 16 using o-toluoyl chloride (15.0 g.). The crude product was crystallized from methanol/water to give the title compound (8.3 g.). This base was converted to the hydrochloride (M.P. 205–8° C.) in isopropanol/diethyl ether and washed with hot isopropanol.

*Analysis.*—Found: 57.2% C; 4.5% H; 22.4% N. $C_{15}H_{13}N_5O \cdot HCl$ requires: 57.1% C; 4.5% H; 22.2% N.

EXAMPLE 19

3-(p-chlorobenzamido)-5-(4-pyridyl)-1(H)-1,2,4-triazole 5-amino-1-(p-chlorobenzoyl)-3-(4-pyridyl)-1,2,4-triazole (2.0 g. from Example 16) was heated in a nitrogen atmosphere for ten minutes in a Wood's metal bath at 250° C. The solid melted and resolidified at this temperature to give the title compound (2.0 g., M.P. >340° C.).

*Analysis.*—Found: 56.3% C; 3.4% H; 23.6% N. $C_{14}H_{10}ClN_5O$ requires: 56.1% C; 3.4% H; 23.4% N.

EXAMPLE 20

3-(p-chlorobenzamido)-5-(3-pyridyl)-1(H)-1,2,4-triazole 5-amino-(p-chlorobenzoyl)-3-(3-pyridyl)-1,2,4-triazole (2.8 g. from Example 17) was heated in a nitrogen atmosphere for five minutes in a Wood's metal bath at 270° C. The solid melted and resolidified at this temperature to give the title compound (2.7 g., M.P. >340° C.).

*Analysis.*—Found: 56.3% C; 3.5% H; 23.6% N. $C_{14}H_{10}ClN_5O$ requires: 56.1% C; 3.4% H; 23.4% N.

EXAMPLE 21

5-(4-pyridyl)-3-(o-toluamido)-1(H)-1,2,4-triazole 5-amino-3-(4-pyridyl)-1-(o-toluoyl)-1,2,4-triazole (3.0 g. from Example 18) was heated in a nitrogen atmosphere for sixteen hours in a Wood's metal bath at 205° C. The solid melted and resolidified at this temperature to give the title compound (2.8 g., M.P. 261° C.).

*Analysis.*—Found: 64.4% C; 4.8% H; 25.2% N. $C_{15}H_{13}N_5O$ requires: 64.5% C; 4.7% H; 25.1% N.

EXAMPLE 22

Tablets for pharmaceutical use can be made according to the formulation 3-isonicotinamido-5-phenyl-1(H)-1,2,4-triazole up to 30% w./w., Celutab Hydrous 64 [1] to 94% w./w., Amberlite IRP 88 [2] 5% w./w. (disintegrant), magnesium stearate B.P. 1% w./w. (lubricant), by dry mixing and subsequent direct compression.

[1] Celutab is a spray crystallized maltose-dextrose mixture.
[2] Amberlite is a trademark.

We claim:

1. A compound selected from the group consisting of (1) bases having the formula

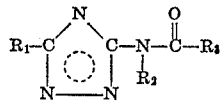

in which A designates a 1,2,4-triazole ring bearing on one of its nitrogen atoms a member selected from the group consisting of hydrogen and lower alkyl, $R_2$ is selected from the group consisting of hydrogen and lower alkyl; at least one of $R_2$ and $R_3$ is pyridyl and the other of $R_1$ and $R_3$ is selected from the group consisting of pyridyl, phenyl, halophenyl, methylphenyl, methoxyphenyl, and benzyl; and (2) the acid addition salts of said bases with pharmaceutically acceptable acids.

2. A compound as defined in claim 1, which is 3-isonicotinamido-5-phenyl-1(H)-1,2,4-trizole or an acid addition salt thereof.

3. A compound as defined in claim 1, which is 3-(N-methyl-isonicotinamido) - 5-phenyl-1(H)-1,2,4-triazole or an acid addition salt thereof.

4. A compound as defined in claim 1, which is 3-isonicotinamido - 5 - p-chlorophenyl-1(H)-1,2,4-triazole, or an acid addition salt thereof.

5. A compound as defined in claim 1, which is 3-isonicotinamido - 5 - o-chlorophenyl-1(H)-1,2,4-triazole, or an acid addition salt thereof.

6. A compound according to claim 1, which is 3-benzyl-5-isonicotinamido-1(H)-1,2,4-triazole or an acid addition salt thereof.

7. A compound according to claim 1, which is 3-isonicotinamido - 4 - methyl-5-phenyl-1,2,4-triazole, or an acid addition salt thereof.

8. A compound according to claim 1, which is 3-(o-toluamido) - 5 - (4-pyridyl)-1(H)-1,2,4-triazole, or an acid addition salt thereof.

References Cited

UNITED STATES PATENTS 3,697,530   10/1972   Imai et al. _____ 260—295 AM

ALAN L. ROTMAN, Primary Examiner

U.S. Cl. X.R.

260—295.5 A, 296 R, 308 R; 424—266; 269

UNITED STATES PATENT OFFICE
CERTIFICATE OF CORRECTION

PATENT NO. : 3,813,400
DATED : May 28, 1974
INVENTOR(S) : John Terence Arnott Boyle and John Christopher Saunders It is certified that error appears in the above-identified patent and that said Letters Patent are hereby corrected as shown below:

Column 1, line 70,

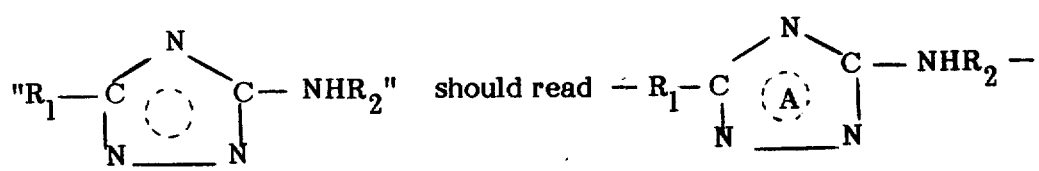

Column 2, line 15,

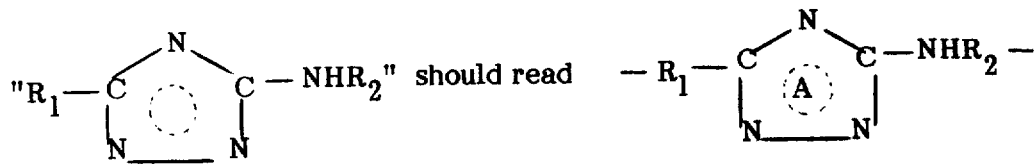

Column 3, line 63, "isomirezation" should read —isomerisation—

Column 7, line 7, "A" should read — S- —

Column 7, line 28, "$C_8H_2ClN_4 \cdot HCl$ requires C, 14.8%;" should read —$C_8H_7ClN_4 \cdot HCl$ requires C, 41.8%;—

UNITED STATES PATENT OFFICE
CERTIFICATE OF CORRECTION

PATENT NO. : 3,813,400

DATED : May 28, 1974

INVENTOR(S) : John Terence Arnott Boyle and John Christopher Saunders

It is certified that error appears in the above-identified patent and that said Letters Patent are hereby corrected as shown below:

Column 7, line 52, $C_9H_{10}O_4 \cdot HCl$" should read —$C_9H_{10}N_4 \cdot HCl$—

Column 8, line 32, "$C_{13}H_{10}N_6O_2HCl \cdot H_2O$" should read —$C_{13}H_{10}N_6O \cdot 2HCl \cdot H_2O$—

Claim 1, line 3,

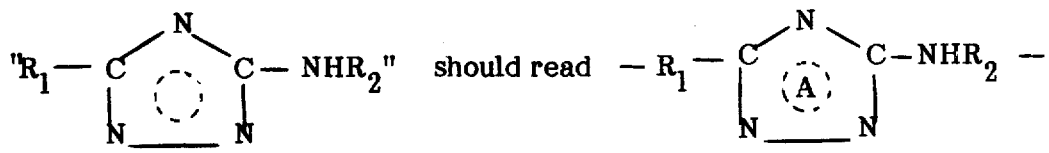

Claim 1, line 8 "$R_2$ and $R_3$" should read —$R_1$ and $R_3$—

Signed and Sealed this

Twenty-fourth Day of April 1979

[SEAL]

Attest:

RUTH C. MASON
Attesting Officer

DONALD W. BANNER
Commissioner of Patents and Trademarks